United States Patent

Kawakami et al.

[11] Patent Number: 4,780,739
[45] Date of Patent: Oct. 25, 1988

[54] ANTI-VIBRATION IMAGING DEVICE

[75] Inventors: Eigo Kawakami; Yukichi Niwa, both of Atsugi; Yasuo Ogino, Yokohama; Minoru Yoshii; Shigeyuki Suda, both of Tokyo; Mitsutoshi Ohwada, Yokohama, all of Japan

[73] Assignee: Canon Kabushiki Kaisha, Tokyo, Japan

[21] Appl. No.: 900,997

[22] Filed: Aug. 27, 1986

[30] Foreign Application Priority Data

Sep. 6, 1985 [JP] Japan .................. 60-198298
Sep. 18, 1985 [JP] Japan .................. 60-206051

[51] Int. Cl.⁴ ............................................. G03B 7/08
[52] U.S. Cl. ...................................... 354/430; 354/65; 354/70
[58] Field of Search ........................... 354/430, 65, 70

[56] References Cited

U.S. PATENT DOCUMENTS

| 3,455,221 | 7/1969 | Reekie | 354/70 |
|---|---|---|---|
| 3,491,668 | 1/1970 | Hillman | 354/65 |
| 3,561,870 | 2/1971 | Redpath | 354/65 |
| 3,577,205 | 5/1971 | Hobrough | 354/70 |
| 3,703,999 | 11/1972 | Forys et al. | 354/70 |
| 4,013,339 | 3/1977 | Ando et al. | 354/70 |
| 4,198,140 | 4/1980 | Frank et al. | 354/457 |
| 4,404,592 | 9/1983 | Pepin et al. | 354/70 |

FOREIGN PATENT DOCUMENTS

| 59-26930 | 2/1984 | Japan . |
|---|---|---|
| 1148951 | 4/1969 | United Kingdom . |
| 2146449 | 4/1985 | United Kingdom . |

OTHER PUBLICATIONS

"Servo Type Camera Anti-Vibration Devices", NHK Technical Journal, vol. 27, No. 11 (1984).

Primary Examiner—Russell E. Adams
Attorney, Agent, or Firm—Fitzpatrick, Cella, Harper & Scinto

[57] ABSTRACT

An imaging device has detection means for detecting an image vibration of the imaging device and drive means for driving at least one of a photoelectric conversion device for converting a light of an object transmitted through a lens system of the imaging device to an electrical signal and the imaging device itself in a direction to cancel the vibration. For a high frequency image vibration, the vibration is compensated by using a piezoelectric device.

20 Claims, 7 Drawing Sheets

ANTI-VIBRATION IMAGING DEVICE

BACKGROUND OF THE INVENTION

1. Field of the Invention

The present invention relates to an anti-vibration structure of an imaging device or observation device.

2. Related Background Art

Photographing while walking or on a traveling vehicle imparts vibration to a camera and renders a photographed image unobservable. Photographing from a vibrating location similarly results of vibration in an image and does not produce a useful image. These results are even more dramatic as the focal distance of a lens system increases.

Prior art approaches to preventing image vibration are as follows. An inclination angle of the optical system, that is, vibrations of the optical system are detected to eccentrically displace a portion of the lens system. Another approach is to have two optical elements of different thicknesses, which satisfy predetermined parameters arranged in a light path of the imaging lens and the image vibration is prevented by displacing the optical element (Japanese Patent Publication No. 26930/1984). However, in the former method, a light intensity changes with eccentricity, and in the latter method, since at least one of the optical elements is placed in front of the lens system, the optical element must be larger than the diameter of a front lens. As a result, the optical system is large and heavy. It has been proposed to compensate for the image vibration by controlling an apex angle of a liquid prism. However, by nature of its structure, a compensation angle is small, and chromatic aberration occurs as the angle increases because the prism is used.

For the method for optically preventing the image vibration, a gyroscope is used in the imaging device having the anti-vibration device so that the camera is always fixed along a direction of gravity, or a motor-driven universal head on which the camera is mounted is driven in accordance with an acceleration or angular velocity detected by an acceleration sensor ("Servo Type Camera Anti-Vibration Device" NHK Technical Journal, vol. 27, No. 11, pages 23-28 (1984)).

In this method, the light intensity does not vary, the weight of the optical system is not heavy and the chromatic aberration does not occur, unlike the method for optically preventing the image vibration. However, in the camera used in the proposed method, since the camera body including the imaging lens as well as a control unit in the camera is driven, the overall imaging device including the anti-vibration device is large and it cannot be used for hand-held photography.

The present applicant has proposed an anti-vibration camera in which an imaging lens device including an imaging lens system and photo-sensing means for sensing a light transmitted through the imaging lens is rotatably mounted on a camera body, and control means is provided to drive the imaging lens in accordance with an output of detection means which detects a vibration of the camera to compensate for the vibration.

The proposed anti-vibration camera has the following advantages.

(1) Since it is not necessary to eccentrically displace a portion of the lens system or insert a prism, an optical performance such as intensity and chromatic aberration is not deteriorated. A range of compensation is wide.

(2) Since the elements to be driven are only the lens system and the photoelectric conversion elements, a power of the drive system may be small and the camera is compact and of light weight.

(3) Since the camera is compact, hand-held photography with a long focal distance lens is permitted, and vibration-free stable image is produced by the hand-held photography while walking, and a vibration-free stable image is also produced by photographing on a traveling vehicle or from a vibrating location. Even a biginner of hand-held photography can produce an image which is substantially free from vibration.

However, the lens system has a fairly large moment of inertia although it is light in weight compared to the overall camera device. Accordingly, the drive system cannot follow a small amplitude vibration component, particularly that which has a high frequency, and the use of the device is limited to certain circumstances. For a large amplitude vibration, similar restriction is imparted because an operable range of the drive system is limited by its structure. Thus, the antivibration means has not been sufficient for the image vibration which includes high and low frequency components.

SUMMARY OF THE INVENTION

It is an object of the present invention to provide an anti-vibration imaging device which can follow an image vibration including any wide range of frequency component.

It is another object of the present invention to provide a compact anti-vibration imaging device which can compensate for a high frequency image vibration.

Other objects of the present invention will be apparent from the following description.

DESCRIPTION OF THE PREFERRED EMBODIMENTS

Figure 1:
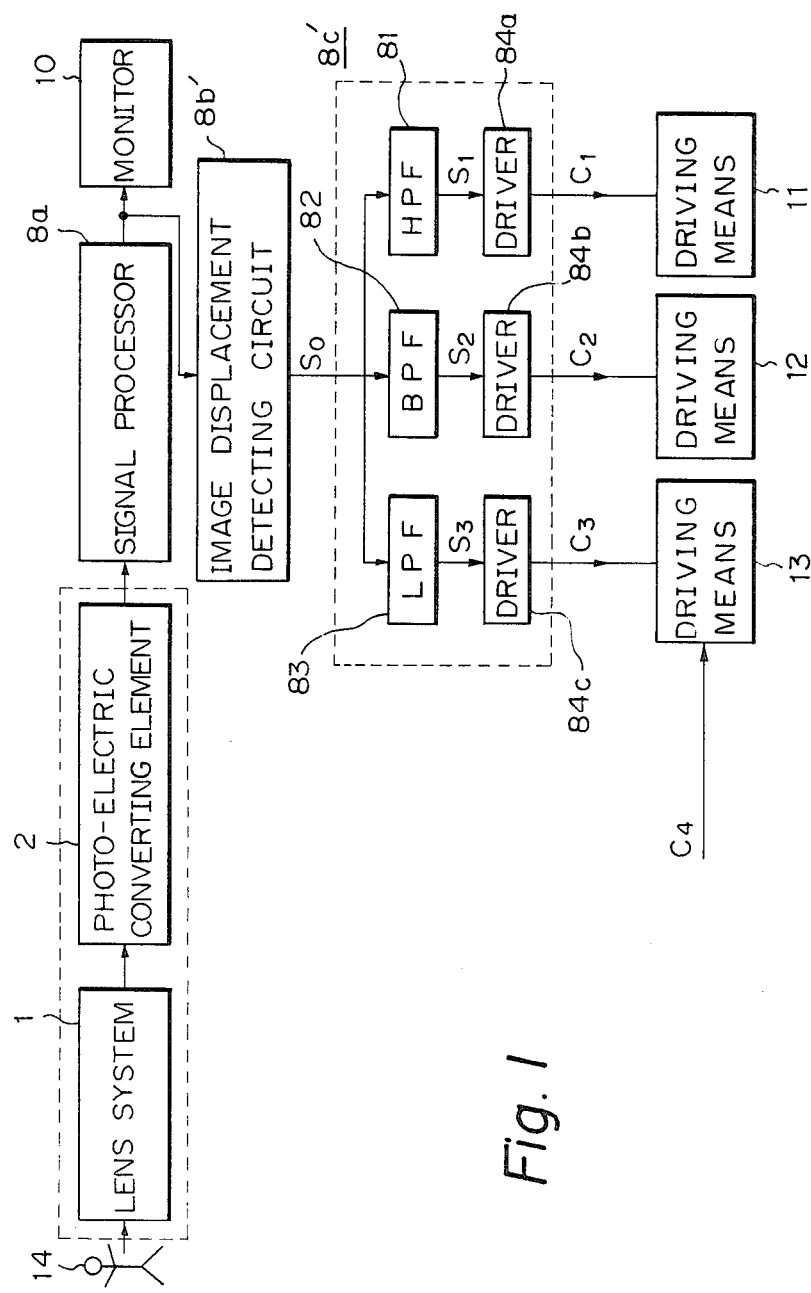
FIG. 1 is a block diagram of an embodiment of the present invention.
Figure 2:
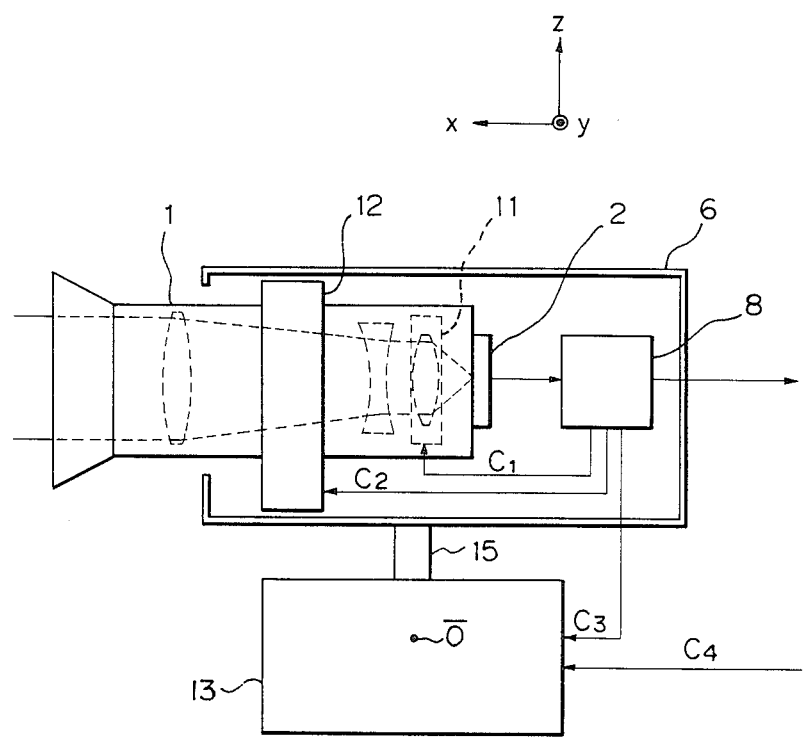
FIG. 2 is a sectional view of an imaging device of the present invention.

FIG. 1 shows a configuration of an embodiment of the present invention, and FIG. 2 shows a sectional view of the embodiment. Throughout the drawings, the like elements or elements having the like functions are designated by the same numerals. In FIG. 1, numeral 8b' denotes an image displacement detector (image vibration detection means) for detecting direction and distance of displacement (image vibration direction and image vibration distance) of an image of an object 14 on an image plane of a photo-electric conversion element 2. Numeral 8c' denotes a control circuit for selecting and controlling drive means 11-13 by an output of the image displacement detector 8b'. Numeral 11 denotes second drive means for high frequency, small amplitude image vibration. Numeral 13 denotes third drive means for low frequency, large amplitude image vibration.

Numeral 12 denotes first drive means for intermediate frequency, intermediate amplitude image vibration, and numeral 15 denotes a member fixed to a housing 6 for transmitting a drive force of the third drive means 13 to the housing.

Figure 3:
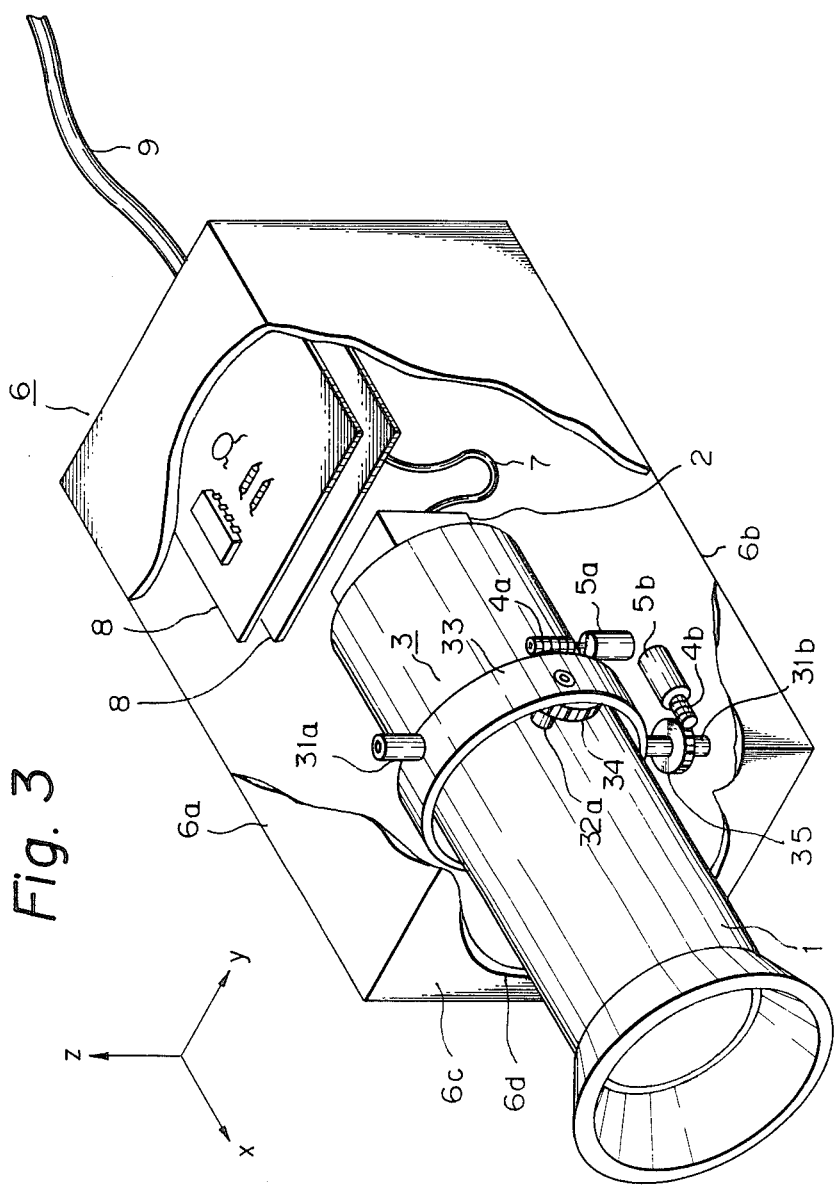
FIG. 3 is a perspective view of the imaging device of the present invention.

FIG. 3 shows a perspective view of an embodiment of the first drive means. Numeral 1 denotes a lens system including a hood, numeral 2 denotes a photoelectric conversion element such as a solid-state imaging element which senses a light transmitted through the lens system 1, and numeral 3 denotes a gimbal for supporting the lens system 1 and the photo-electric conversion element 2. The gimbal comprises two shafts 31a–31b and 32a–32b (not shown) and a ring-shaped member 33. Each portion of the shaft 31a–31b has one end thereof fixed to the ring member 33 and the other end thereof rotatably mounted on an upper surface 6a and a lower surface 6b of the camera housing or external member 6. Each portion of the shaft 32a–32b has one end thereof fixed to a body tube of the lens system 1 and the other end rotatably mounted on the ring member 33. Accordingly, the lens system 1 and the photo-electric conversion element are rotatably supported about the y-axis and z-axis of the external member 6. An x-axis is parallel to the optical axis. Numerals 4a and 4b denote worm gears which transmit drive forces of motors 5a and 5b through worm wheels 34 and 35 fitted to the shafts 32a and 31b, respectively, to rotate the lens system 1 and the photo-electric conversion element 2 around the two shafts of the gimbal 3. The motor 5a is fixed to the ring member 33 of the gimbal, and the motor 5b is fixed to the bottom 6b of the external member 6. Numeral 7 denotes a signal transmission member for transmitting the output of the photo-electric conversion element 2 to a circuit board 8 which includes the signal processing circuit 8a shown in FIG. 2 and an image vibration detector 8b and a drive control circuit 8c. Numeral 9 denotes a coaxial cable for transmitting an image signal to a monitor 10 shown in FIG. 1. In FIG. 1, numeral 30 denotes an imaging lens device including the imaging lens system 1 and the photo-electric conversion element 2.

The operation of the first drive means 12 is explained below.

In FIG. 1, the output of the photo-electric conversion element 2 is supplied to the image vibration detector 8b through the signal processor 8a. A correlation between images spaced by a predetermined time period is made to detect magnitude and direction of the image vibration, and a control signal is supplied to the drive controller 8c. As the drive controller 8c receives the control signal, it drives the motor 5 (5a and 5b in FIG. 1) in a direction to cancel the image vibration. Accordingly, even if an external disturbance is applied to the external member 6 of the camera, the compensation is made as described above so that the lens system 1 and the photoelectric conversion element 2 are kept correctly faced to the object. Thus, a vibration-free, stable image is produced.

Numeral 11 in FIG. 2 denotes the second drive means. For example, a relay lens behind an afocal optical system is suspended by the following suspension mechanism.

Figure 4A:
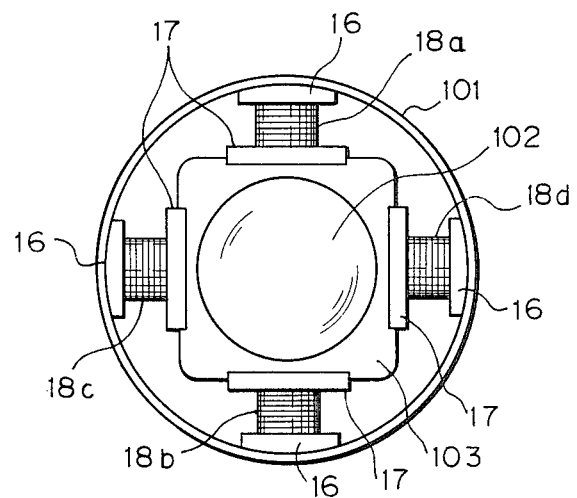
FIG. 4 shows major portions of the imaging device of the present invention.
Figure 4B:
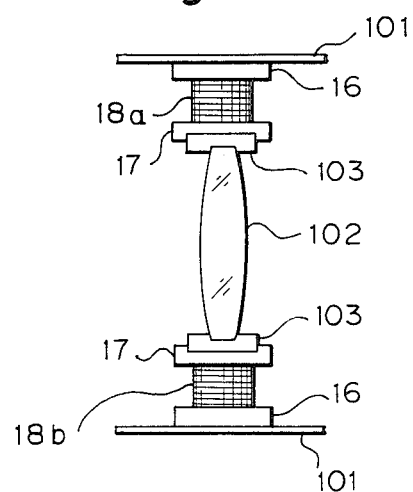

FIG. 4 shows a front view (FIG. 4A) and a side sectional view (FIG. 4B) of an embodiment of the second drive means. Numeral 101 denotes a drum body, numeral 102 denotes a lens, numeral 103 denotes a lens frame, numerals 18a–18d denote laminated piezoelectric elements which are fixed to the drum body 101 by a member 16, and numeral 17 denotes a member having one surface thereof fixed to the piezoelectric device 18 and the other surface which is a concave surface fitted to the lens frame 103 to slidably support the lens frame 103.

If a voltage is applied in a direction to expand the piezoelectric element 18a and contract the piezoelectric element 18b, the lens frame 103 is supported by the left and right support members 17 shown in FIG. 4A and slides downward. Thus, the lens 102 is eccentrically displaced normally to the optical axis so that the image of the object 14 on the image plane of the photo-electric conversion element 2 is moved downward (z-direction in FIG. 2) by a prism effect. Similarly, if the direction of voltage application is changed by a combination of the piezoelectric elements 18c and 18d, the image of the object 14 can be moved in the y-direction. Thus, by changing the polarities and magnitudes of the voltages applied to the piezoelectric elements 18a, 18b, 18c and 18d, the image of the object 14 can be slightly moved in the y-z plane at a high speed.

As described above, the first drive means 12 rotates the lens system 1 including the photo-electric element 2 and the drive means 11 around the y-axis and the z-axis by the combination of the motor 5 and the gear 4 through the gimbals 3. The third drive means 13 may be a well-known power-driven universal head which rotates the housing 6 (FIG. 2) around the point 0 around the y-axis, and around the member 15 around the z-axis.

Figure 5A:
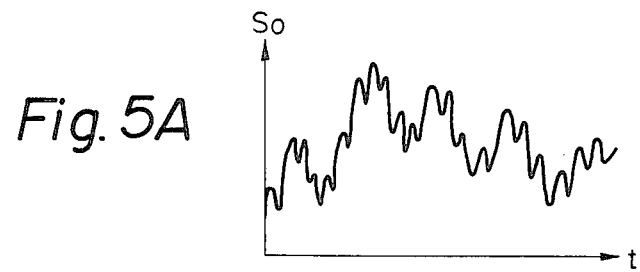
FIG. 5 shows a waveform of a vibration signal.
Figure 5B:
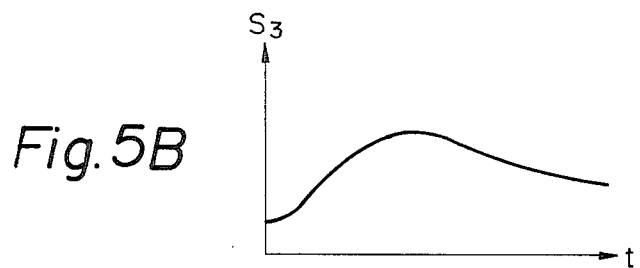
Figure 5C:
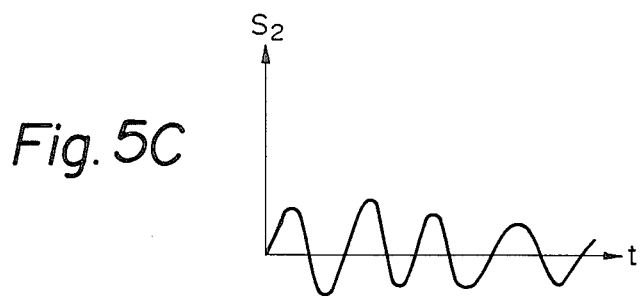
Figure 5D:
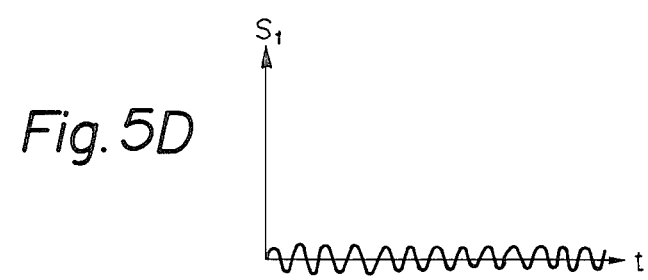

The operation of the present embodiment of the imaging device is now explained. In FIG. 1, the output of the photo-electric conversion element 2 is supplied to the image displacement detector 8b' through the signal processor 8a. The images spaced from each other by a predetermined time period are correlated to detect the direction and magnitude of the image vibration, and the image vibration signal So is supplied to the control circuit 8c'. Because the correlations are usually made in the y-direction and the z-direction on the image plane of the photo-electric conversion element 2, the image vibration signals So are produced separately in the y-direction and z-direction. For the sake of simplicity, only the y-direction is considered here. Assuming that the image vibration signal So shown in FIG. 5A is produced relative to time t, the control circuit 8c' divides the signal So into three portions, which are supplied to a low-pass filter (LPF) 83, a band-pass filter (BPF) 82 and a high-pass filter (HPF) 81, respectively, so that new image vibration signals $S_3$ (FIG. 5B), $S_2$ (FIG. 5C) and $S_1$ (FIG. 5D) are produced. The signals $S_1$–$S_3$ are converted by the respective drivers 84a–84c to control signals $C_1$–$C_3$ for the drive means 11–13, and the control signals $C_1$–$C_3$ are supplied to the drive means 11–13. The drive means drive in accordance with the control signals $C_1$–$C_3$ in the directions to render the image vibration signal So zero. In the present embodiment, the second drive means 11 drives the piezoelectric elements 18c and 18d of FIG. 4 such that the image vibration signal $S_1$ is rendered zero, the first drive means 12 drives the motor 5b of FIG. 3 such that the image vibration signal $S_3$ is rendered zero, and the third drive means 13 rotates the member 15 such that the image vibration signal $S_3$ is rendered zero. Similar control is made in the z-direction of the image plane of the photoelectric conversion element 2.

In this manner, the image of the object 14 is kept at a constant position on the image plane of the photo-electric conversion element 2 so that the vibration-free and stable image is always produced. $C_4$ denotes a control signal from a controller (not shown). Panning may be attained by the control signal $C_4$ by utilizing the third drive means 13 for the low frequency, large amplitude image vibration.

Figure 6:
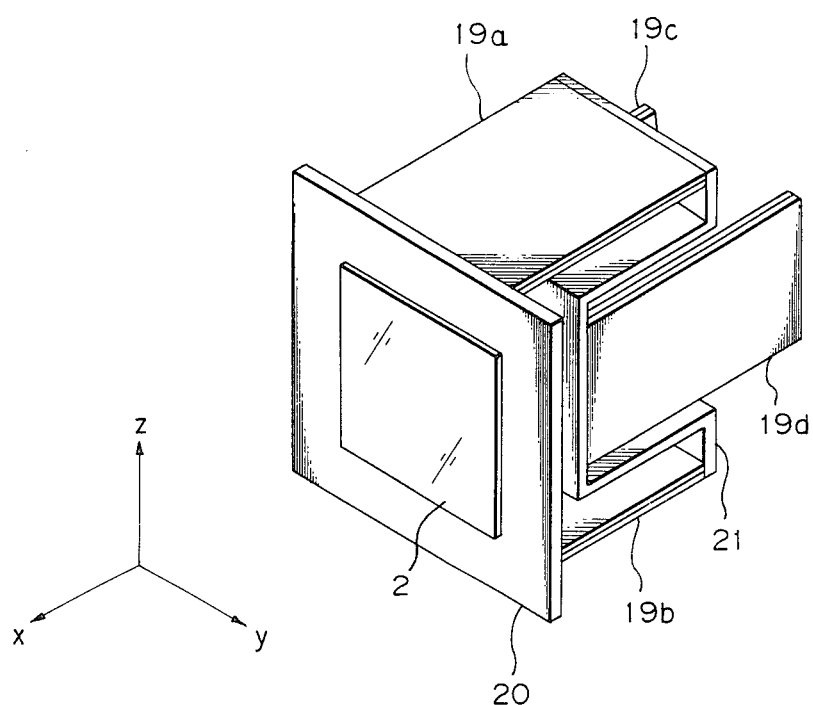
FIG. 6 shows another embodiment of the present invention.

FIG. 6 shows another embodiment of the second drive means. Numeral 20 denotes a base plate on which the photo-electric element 2 is mounted, numerals 19a–19d denote bimolf type piezoelectric elements, and numeral 21 denotes a member which connects the pair of the piezoelectric elements 19a and 19b with the pair of 19c and 19d. The pair of the piezoelectric elements 19a and 19b have first ends thereof fixed to the base plate 20 and the other ends thereof fixed to the connecting member 21, and the pair of piezoelectric elements 19c and 19d have first ends thereof fixed to the connecting member 21 and the other ends thereof fixed to the housing (not shown) of the imaging device. By changing the polarities and magnitudes of the voltages applied to the piezoelectric elements 19a, 19b and 19c, 19d, the photo-electric conversion element 2 is displaced in the z-direction and y-direction, respectively. By relatively displacing the position of the image of the object 14 normally to the optical axis, the image vibration signal ($S_1$) can be rendered zero in the same manner as in FIG. 4.

Figure 7:
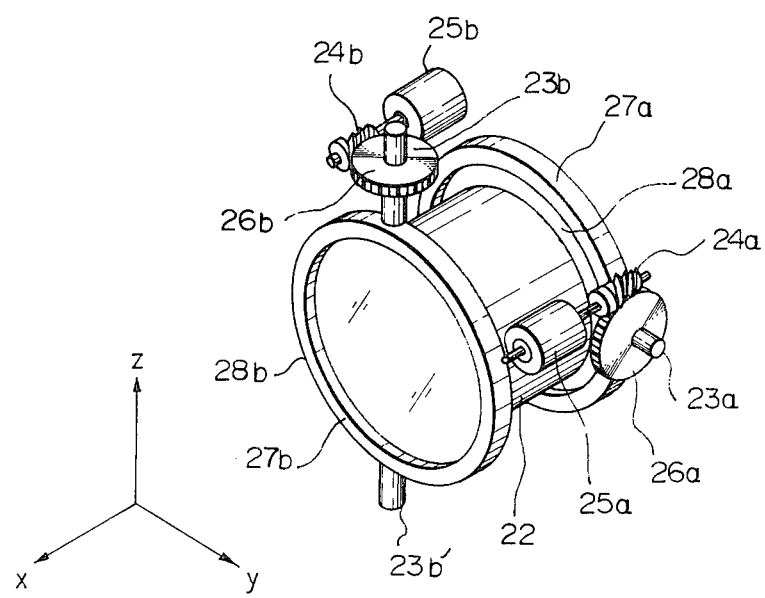
FIG. 7 shows still another embodiment of the present invention.

FIG. 7 shows a third embodiment of the second drive means. Numeral 22 denotes a disc-shaped elastic member such as silicone rubber, having both planes thereof deposited to glass plates 28a and 28b. Numerals 27a and 27b denote holding frames for the glass plates 28. Numerals 23a, 23a' (not shown) and 23b, 23b' denote shafts having first ends thereof fixed to the holding frames and the other ends rotatably mounted on a drum body (not shown), and numerals 24a and 24b denote worm gears for transmitting drive forces of motors 25a and 25b mounted on the drum body to the shafts 23a and 23b through worm wheels 26a and 26b fitted to the shafts 23a and 23b. As the motors 25a and 25b are driven, the glass plate 28a is rotated around the y-axis and the glass plate 28b is rotated around the z-axis so that the end surface of the elastic member 22 is inclined relative to the optical axis (x-axis). As a result, the position of the image of the object 14 on the image plane of the photo-electric conversion element 2 is displaced by the prism effect and the image vibration signal can be rendered zero as is done in FIG. 4.

In the above embodiments, the image vibration detection means correlates the image signals. Alternatively, an acceleration sensor may be mounted on the imaging device so that the signal output to the controller 8c' is changed in accordance with the output of the acceleration sensor. In this case, the photoelectric conversion element 2 may be a silver halide film.

In the above embodiments, the image vibration signal is divided into band signals for the respective drive means through the filters to produce the control signals for the respective drive means. The use of a plurality of elements having different gain-frequency characteristics for each drive means to select and separate the frequencies is within the scope of the present invention.

The three drive means as shown in the embodiment are not always required. For example, in hand-carry photographing by an ENG camera, the third drive means 13 and the member 15 may be removed from the housing 6, and an image vibration (or manual vibration) warning may be displayed on a finder by the control signal $C_3$ to attract the attention of a photographer. Thus, the imaging device can offer the anti-vibration function not only in the remote control photographing mode but also in the manual photographing mode. Instead, panning may be made by using the third drive means.

The drive means are not limited to those shown in the above embodiments, and they need not be two-axis (z-axis and y-axis) drives.

In FIG. 4, the convex lens is moved. Alternatively, a concave lens may be used or a combination of a plurality of optical elements may be moved.

In accordance with the present invention, a plurality of drive means are selectively activated in accordance with the magnitude and frequency of the image vibration signal to control the position of the object image on the image plane of the photo-electric conversion element. Accordingly, the present invention offers the following advantages.

(1) The controllable ranges of the magnitude and the frequency of the image vibration are widened compared to the compensation by single drive means.

(2) Since the respective drive means share the range, the loads of the respective drive means are reduced and the design is facilitated and a compact and low power consumption device is provided.

(3) For the high frequency, small amplitude drive means, the displacement may be small. Accordingly, one part of the lens system may be modified or an inclination angle of the prism or a position of the photo-electric conversion element may be varied (which has raised a problem in the prior art device because of degradation of the optical performance) and the high frequency image vibration can be suppressed.

Further, since two pairs of piezoelectric elements are used to eccentrically displace the optical element and/or the photo-electric conversion element normal to the optical axis of the imaging device, the following advantages are offered.

(4) The weight of the driven member is small, and piezoelectric elements are used. Accordingly, the image can be deflected at a high speed.

(5) The system is compact, and when it is mounted on the imaging device, no essential change in shape is necessary and the weight increase is small.

(6) When it is applied to an anti-vibration imaging device, a high frequency image vibration can be compensated.

(7) Because the piezoelectric element has a high response, the system can be applied to the anti-vibration means for a video camera as well as a still camera.

We claim:

1. An anti-vibration imaging device comprising:
    (a) image means, having a plurality of elements, for imaging an object;
    (b) detection means for detecting a vibration of the image means;
    (c) separation means for separating an output frequency of said detection means into a plurality of different frequency components;
    (d) a plurality of driving means for driving said plurality of elements, and each of said elements corresponds to an individual driving means; and
    (e) control means for driving and controlling said plurality of driving means based on each respective component of said frequency components so as to stabilize vibration.

2. An anti-vibration imaging device according to claim 1, wherein said plurality of elements includes a lens system for focusing the object image and a photoelectric conversion element for converting the image focused by said lens system to an electrical signal.

3. An anti-vibration imaging device according to claim 1, wherein said separation means includes a high-pass filter for passing high frequency components, a band-pass filter for passing intermediate frequency components and a low-pass filter for passing low frequency components.

4. An anti-vibration imaging device according to claim 2, wherein said control means drives said lens system.

5. An anti-vibration imaging device according to claim 2, wherein said control means drives said photoelectric conversion element.

6. An anti-vibration imaging device according to claim 2, wherein said control means drives said plurality of elements.

7. An anti-vibration imaging device comprising:
(a) image forming means for forming an image of an object;
(b) a case for housing said image forming means;
(c) a piezoelectric element for supporting said image forming means to said case, wherein said piezoelectric element displaces said image forming means in a direction substantially perpendicular to the optical axis of said image forming means;
(d) detection means for detecting a vibration of said image forming means; and
(e) a drive circuit for applying a signal representing the output of said detection means to said piezoelectric element to drive said piezoelectric element.

8. An anti-vibration imaging device according to claim 7, wherein said image forming means includes a lens system for focusing the object image and an image detector for detecting the focused object image.

9. An anti-vibration imaging device according to claim 8, wherein said piezoelectric element supports said lens system.

10. An anti-vibration imaging device according to claim 8, wherein said piezoelectric element supports said image detector.

11. An anti-vibration image device according to claim 8, wherein said piezoelectric element supports said image detector, and displaces said image detector in a direction substantially perpendicular to the optical axis of said lens system.

12. An image stabilization device comprising:
(a) an image forming device for forming an image of an object, and including at least a first element and a second element;
(b) generating means for generating a vibration signal corresponding to vibration of said image forming means;
(c) separation means for separating the vibration signal into a plurality of components having at least a first signal and a second signal and outputting said components; and
(d) first driving means for driving said first element in response to said first signal, and second driving means for driving said second element in response to said second signal.

13. An image stabilization device according to claim 12, wherein said generating means generates the vibration signal based on an image signal of the image produced by said image forming means.

14. An image stabilization device according to claim 12, wherein said separation means separates the vibration signal into a plurality of frequency components.

15. An image stabilization device according to claim 12, wherein said image forming means further includes a third element.

16. An image stabilization device according to claim 15, wherein said separation means further separates the vibration signal into a third signal.

17. An image stabilization device according to claim 16, further comprising a third driving means for driving the third element in response to the third signal.

18. An image stabilization device according to claim 12, wherein the first element is a lens.

19. An image stabilization device according to claim 12, wherein the second element is a lens barrel.

20. An image stabilization device according to claim 17, wherein the third element is a camera body.

* * * * *